Patented June 7, 1932

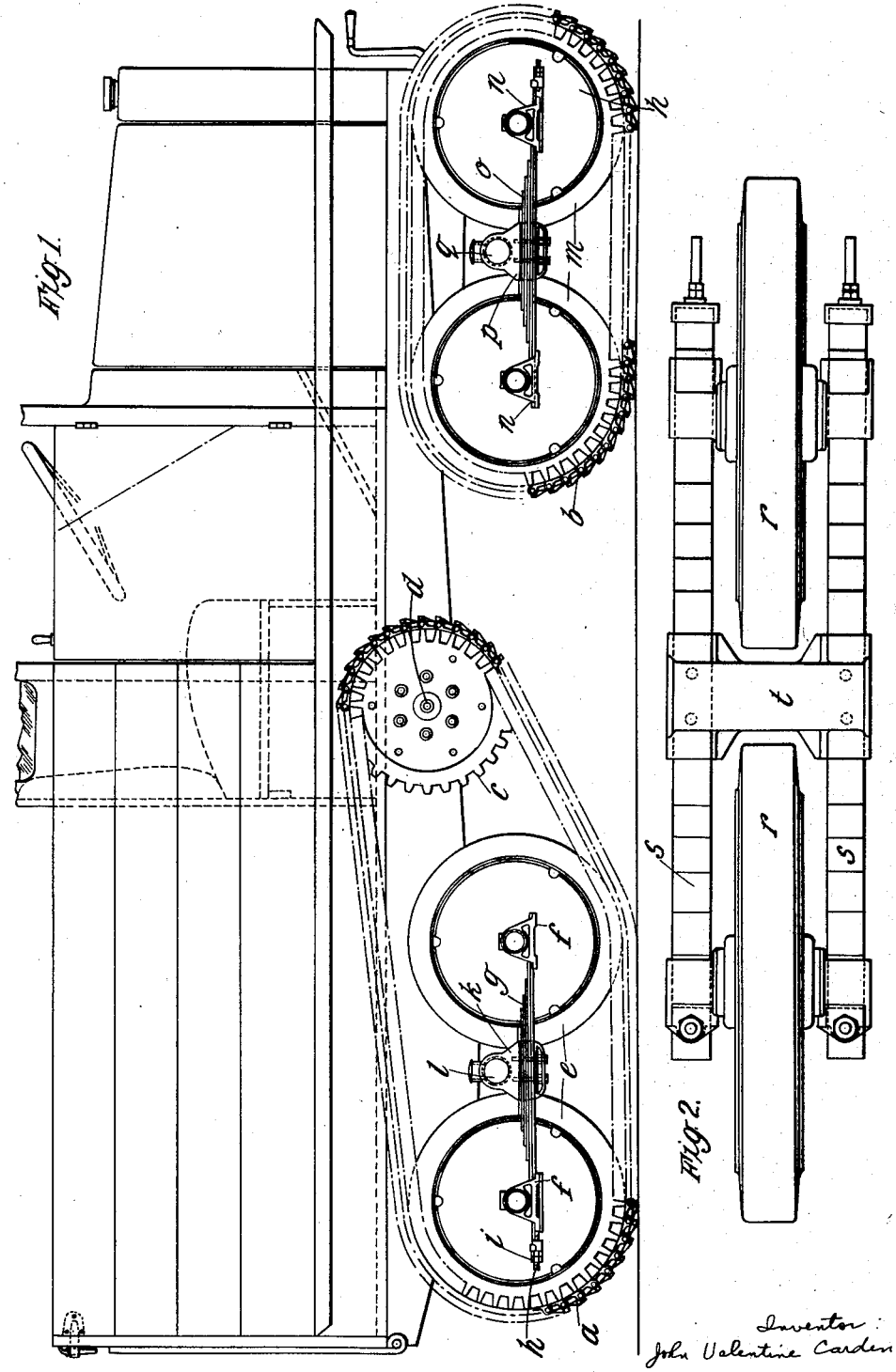

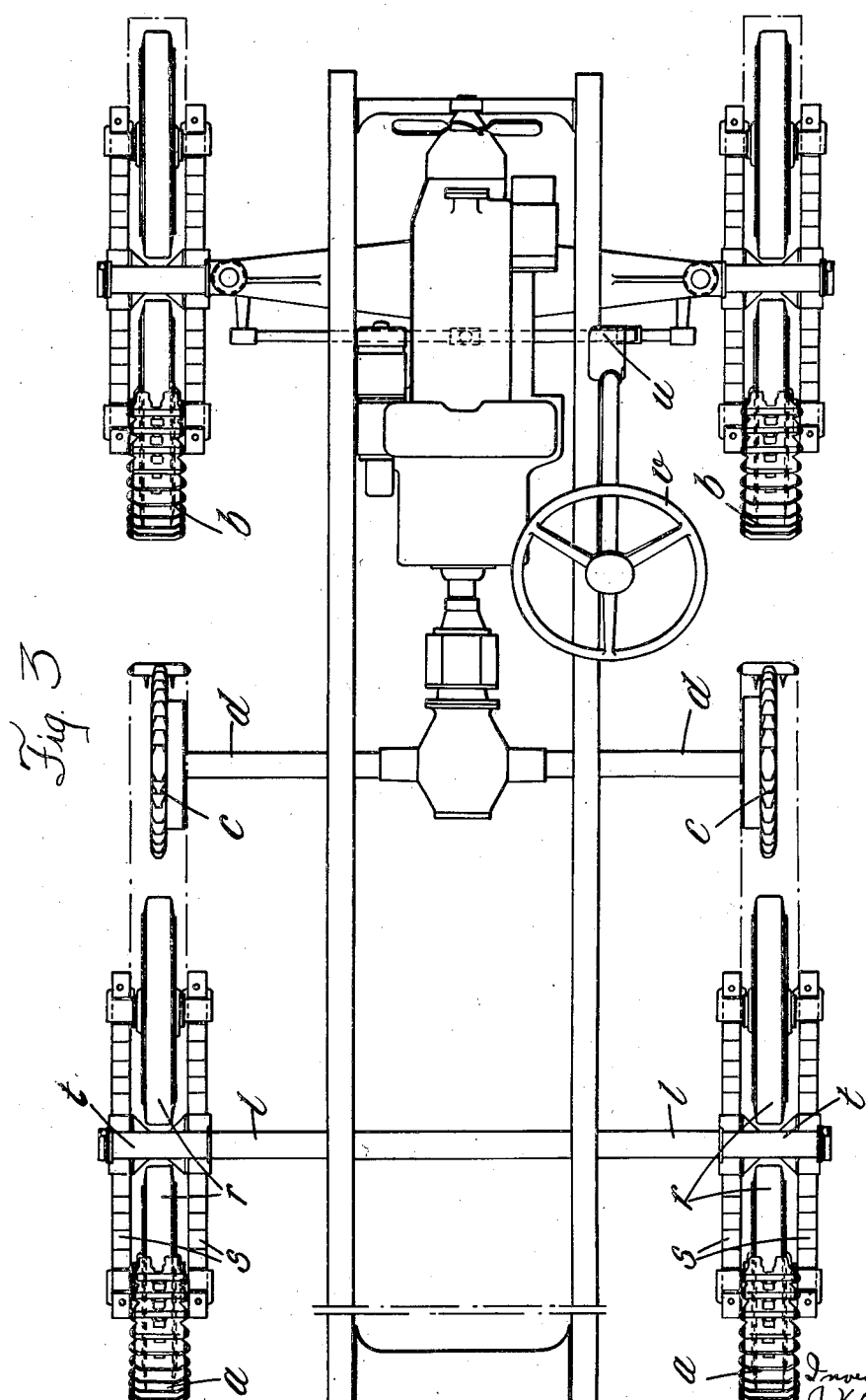

1,862,329

UNITED STATES PATENT OFFICE

JOHN VALENTINE CARDEN, OF PICCADILLY, WESTMINSTER, ENGLAND, ASSIGNOR TO VICKERS-ARMSTRONGS LIMITED, OF WESTMINSTER, ENGLAND, A BRITISH COMPANY

ENDLESS TRACK VEHICLE

Application filed July 20, 1929, Serial No. 379,855, and in Great Britain August 24, 1928.

This invention relates to endless track vehicles and has particular though not exclusive reference to such vehicles of the lorry or wagon type that are especially intended for cross country work, such as military transport vehicles.

One of the objects of the present invention is to provide in an endless track vehicle, a pair of rear endless driving tracks and a pair of front endless tracks which are adapted to be moved independently of the rear tracks for steering purposes, a pair of supporting wheels associated with each of said endless tracks each pair of wheels associated with said tracks being mounted at the opposite ends of a laminated spring member pivotally carried by the framework of the vehicle, the supporting wheels on one side of the vehicle being mounted independently of those on the other side of the vehicle so as to permit independent relative movement between all of the wheels of the vehicle.

A further object is to provide in an endless track vehicle, a pair of rear endless driving tracks and a pair of front endless driving tracks which are adapted to be moved independently of the rear tracks for steering purposes, a pair of supporting wheels associated with each of said endless tracks each pair of wheels associated with said tracks being mounted between the ends of a pair of laminated spring members pivotally carried by the framework of the vehicle, the supporting wheels on one side of the vehicle being mounted independently of those on the other side of the vehicle so as to permit independent relative movement between all of the wheels of the vehicle.

In order that the said invention may be clearly understood and readily carried into effect the same will now be described more fully with reference to the accompanying drawings, in which:—

Figure 1 illustrates one embodiment of the invention,

Figure 2 is a plan view of a modified arrangement of spring suspension in which a pair of supporting roller or wheels is disposed between two spring members, and Figure 3 is a plan view of a vehicle similar to that shown in Figure 1 but equipped with the spring suspension shown in Figure 2.

In Figure 1, $a$ is one of the rear tracks and $b$ is one of the front tracks. $c$ is the driving sprocket for the rear track and $d$ is the transverse shaft by which the driving sprocket is carried. $e, e$ are the supporting wheels for one of the rear tracks and $f, f$ are the blocks or bearings in which the supporting wheels are journalled. $g$ is the laminated spring member to the ends of which the blocks or bearings $f$ are rigidly secured. Where it is desirable for one or more of the blocks or bearings $f$ to be adjustable they may be formed with screw-threaded extension pieces $h$ having one or more nuts $i$ mounted thereon so as to bear against a part of the spring member in such a manner that by adjustment of the nuts the block or bearing can be displaced longitudinally of the spring member. $k$ is the block to which the middle part of the spring member is secured and $l$ is the shaft on which the block $k$ is rotatably mounted, the said shaft being suitably secured to a part of the undercarriage of the vehicle. $m, m$ are the supporting wheels for one of the front tracks $b$ and $n, n$ are the blocks or bearings in which the supporting wheels are journalled. The blocks $n$ are secured to the ends of a laminated spring member $o$ which is similar to the laminated spring member $g$ and the middle part of which is secured to a block $p$ which is mounted on a shaft $q$ in a manner similar to that described above in connection with the block $k$. In the construction shown one of the blocks $p$ is provided with a screw and nut adjustment device which is also similar to that described above as applied to one of the blocks $k$.

In Figures 2 and 3 a pair of supporting rollers or wheels $r, r$ are shown disposed between a pair of parallel laminated spring members $s, s$ which are similar to the members $g$ and $o$ above referred to. The rollers or wheels are journalled in blocks or bearings which are formed on, or secured to, the ends of the spring members and the two spring members are connected to one another at their middle parts by a block $t$ which is adapted to be rotatably or pivotally mounted on a shaft $l$ in a manner similar to that described above in connection with the blocks $k$ and $p$.

The front tracks $b$ shown in Figures 1 and 3, it will be observed, are moved independently of the rear tracks for steering purposes. The front tracks $b$ are moved in any convenient manner through the medium of suitable steering mechanism indicated generally by the reference numeral $u$ and operated by the hand wheel V.

In the following claims the term "wheels" is intended to include "rollers".

What I claim and desire to secure by Letters Patent of the United States is:—

1. In an endless track vehicle, the provision of a pair of rear endless driving tracks and a pair of front endless driving tracks which are adapted to be moved independently of the rear tracks for steering purposes, a pair of supporting wheels associated with each of said endless tracks each pair of wheels associated with said tracks being mounted at the opposite ends of a laminated spring member pivotally carried by the framework of the vehicle, the supporting wheels on one side of the vehicle being mounted independently of those on the other side of the vehicle so as to permit independent relative movement between all of the wheels of the vehicle.

2. In an endless track vehicle, the provision of a pair of rear endless driving tracks and a pair of front endless driving tracks which are adapted to be moved independently of the rear tracks for steering purposes, a pair of supporting wheels associated with each of said endless tracks each pair of wheels associated with said tracks being mounted between the ends of a pair of laminated spring members pivotally carried by the framework of the vehicle, the supporting wheels on one side of the vehicle being mounted independently of those on the other side of the vehicle so as to permit independent relative movement between all of the wheels of the vehicle.

JOHN VALENTINE CARDEN.